United States Patent
Yang et al.

(10) Patent No.: US 8,179,059 B2
(45) Date of Patent: May 15, 2012

(54) CIRCUIT AND METHOD FOR CONTROLLING LIGHT EMITTING DEVICE, AND INTEGRATED CIRCUIT THEREFOR

(75) Inventors: Chih-Hao Yang, Tainan (TW); Fu-Yuan Shih, Danshuei Township, Taipei County (TW); An-Tung Chen, Pingzhen (TW); Shui-Mu Lin, Taichung (TW)

(73) Assignee: Richtek Technology Corporation, R.O.C., Hsin-Chu (TW)

( * ) Notice: Subject to any disclaimer, the term of this patent is extended or adjusted under 35 U.S.C. 154(b) by 306 days.

(21) Appl. No.: 12/579,802

(22) Filed: Oct. 15, 2009

(65) Prior Publication Data
US 2011/0089854 A1    Apr. 21, 2011

(51) Int. Cl.
*G05F 1/00* (2006.01)
*H05B 37/02* (2006.01)
*H05B 39/04* (2006.01)
*H05B 41/36* (2006.01)
*H05B 37/00* (2006.01)
*H05B 39/00* (2006.01)
*H05B 41/00* (2006.01)

(52) U.S. Cl. ........ 315/297; 315/291; 315/294; 315/307; 315/312

(58) Field of Classification Search .......... None
See application file for complete search history.

(56) References Cited

U.S. PATENT DOCUMENTS

| | | | |
|---|---|---|---|
| 6,933,707 B2* | 8/2005 | Allen | 323/265 |
| 7,307,385 B2* | 12/2007 | Yamamoto et al. | 315/224 |
| 2008/0224636 A1* | 9/2008 | Melanson | 315/307 |
| 2010/0181941 A1* | 7/2010 | Kuo et al. | 315/320 |

OTHER PUBLICATIONS

M.P. Theodoridis, S.V.Mollov, Improved Gate Driver for a 13.56MHz Resonant Inverter, 2004,IEE,Michael Faraday House, p. 144 [retrieved on Oct. 6, 2011]. Retrieved from IEEE Explore.*

* cited by examiner

*Primary Examiner* — Douglas W Owens
*Assistant Examiner* — Dedei K Hammond
(74) *Attorney, Agent, or Firm* — Tung & Associates

(57) ABSTRACT

The present invention discloses a circuit and a method for controlling a light emitting device, and an integrated circuit therefore. The circuit for controlling a light emitting device comprises: a power stage controller circuit controlling a power stage circuit to convert an input voltage to an output voltage, which is supplied to at least one light emitting device channel including at least one light emitting device; a transistor switch in the light emitting device channel; and a current source circuit controlling a current through the light emitting device channel, wherein the power stage controller circuit and the current source circuit are integrated in an integrated circuit which provides a control voltage to control a gate of the transistor switch.

21 Claims, 6 Drawing Sheets

CIRCUIT AND METHOD FOR CONTROLLING LIGHT EMITTING DEVICE, AND INTEGRATED CIRCUIT THEREFOR

BACKGROUND OF THE INVENTION

1. Field of Invention

The present invention relates to a circuit and a method for controlling a light emitting device, and particularly to such circuit and method which are capable of reducing the pin number of an integrated circuit. The present invention also relates to an integrated circuit for use therein.

2. Description of Related Art

Referring to FIG. 1, conventionally, a light emitting device controller circuit includes an integrated circuit 20, wherein the integrated circuit 20 includes a power stage controller circuit 21 for controlling the operation of a power transistor in a power stage circuit 60 to convert an input voltage Vin to an output voltage Vout for supplying to multiple channels of light emitting diodes (LEDs) CH1-CHn. The power stage circuit 60 for example may be, but is not limited to, synchronous or asynchronous buck converter, boost converter, buck-boost converter, inverter converter, or fly-back converter, as shown in FIGS. 2A-2G. Depending on each application, the power transistor or diode in the power stage circuit 60 may be integrated into the integrated circuit 20 in certain circumstances.

To control the brightness of each LED channel, FIG. 1 shows a current source circuit CS1 formed by an operational amplifier OP1, a transistor Q1, and a resistor R1, for controlling the current through the first LED channel CH1; a current source circuit CS2 formed by an operational amplifier OP2, a transistor Q2, and a resistor R2, for controlling the current through the second LED channel CH2; and so on. Since multiple LEDs are connected in each LED channel, the output voltage Vout is quite high; hence, the transistors Q1-Qn should be devices capable of sustaining high voltage. However, such devices can not be integrated into the integrated circuit 20, but need to be provided outside of the integrated circuit 20. Therefore, to control N LED channels, the integrated circuit 20 requires pins P1-P2N, twice the number of the channels.

In certain cases as shown in FIG. 3, it is required to obtain the drain signals of the transistors Q1-Qn; however, to connect these nodes to the integrated circuit 20 further increases the pin number to three times of the channel number.

In view of the foregoing, the present invention provides a circuit and a method for controlling alight emitting device, with which the pin number of the integrated circuit is reduced.

SUMMARY OF THE INVENTION

An objective of the present invention is to provide a light emitting device controller circuit.

Another objective of the present invention is to provide a method for controlling a light emitting device.

Yet another objective of the present invention is to provide an integrated circuit for use in a light emitting device controller circuit.

To achieve the foregoing objective, in one perspective of the present invention, it provides a light emitting device controller circuit comprising: a power stage controller circuit controlling a power stage circuit to convert an input voltage to an output voltage, the output voltage being supplied to at least one light emitting device channel which includes at least one light emitting device; a transistor switch in the light emitting device channel; and a current source circuit controlling a current through the light emitting device channel; wherein the power stage controller circuit and the current source circuit are integrated in an integrated circuit which provides a control voltage to control a gate of the transistor switch.

In another perspective of the present invention, it provides a method for controlling a light emitting device in a light emitting device channel, comprising: providing a transistor switch in the light emitting device channel; providing an integrated circuit, the transistor switch being located outside of the integrated circuit; providing a current source circuit in the integrated circuit to control a current through the light emitting device channel; and providing a control voltage by the integrated circuit to control a gate of the transistor switch.

In yet another perspective of the present invention, it provides an integrated circuit for use in a light emitting device controller circuit which controls at least one light emitting device channel, the channel including at least one light emitting device and one transistor switch coupled to the light emitting device, wherein the light emitting device controller circuit includes a power stage circuit, the integrated circuit comprising: a power stage controller circuit controlling the power stage circuit to convert an input voltage to an output voltage supplied to the at least one light emitting device channel; and a current source circuit controlling a current through the light emitting device channel; wherein the integrated circuit provides a control voltage to control a gate of the transistor switch.

In the foregoing controller circuit, method, or integrated circuit, as the transistor switch has a first terminal coupled to the light emitting device and a second terminal coupled to the current source circuit, a voltage at the second terminal of the transistor switch can be compared with a reference voltage to determine whether a short circuit occurs in the light emitting device channel. The reference voltage may be set at a level between the output voltage and a voltage at the first terminal of the transistor switch.

The control voltage can be constantly higher, always higher, periodically higher, occasionally higher, or only once higher than the reference voltage.

The objectives, technical details, features, and effects of the present invention will be better understood with regard to the detailed description of the embodiments below, with reference to the drawings.

DESCRIPTION OF THE PREFERRED EMBODIMENTS

Figure 1:
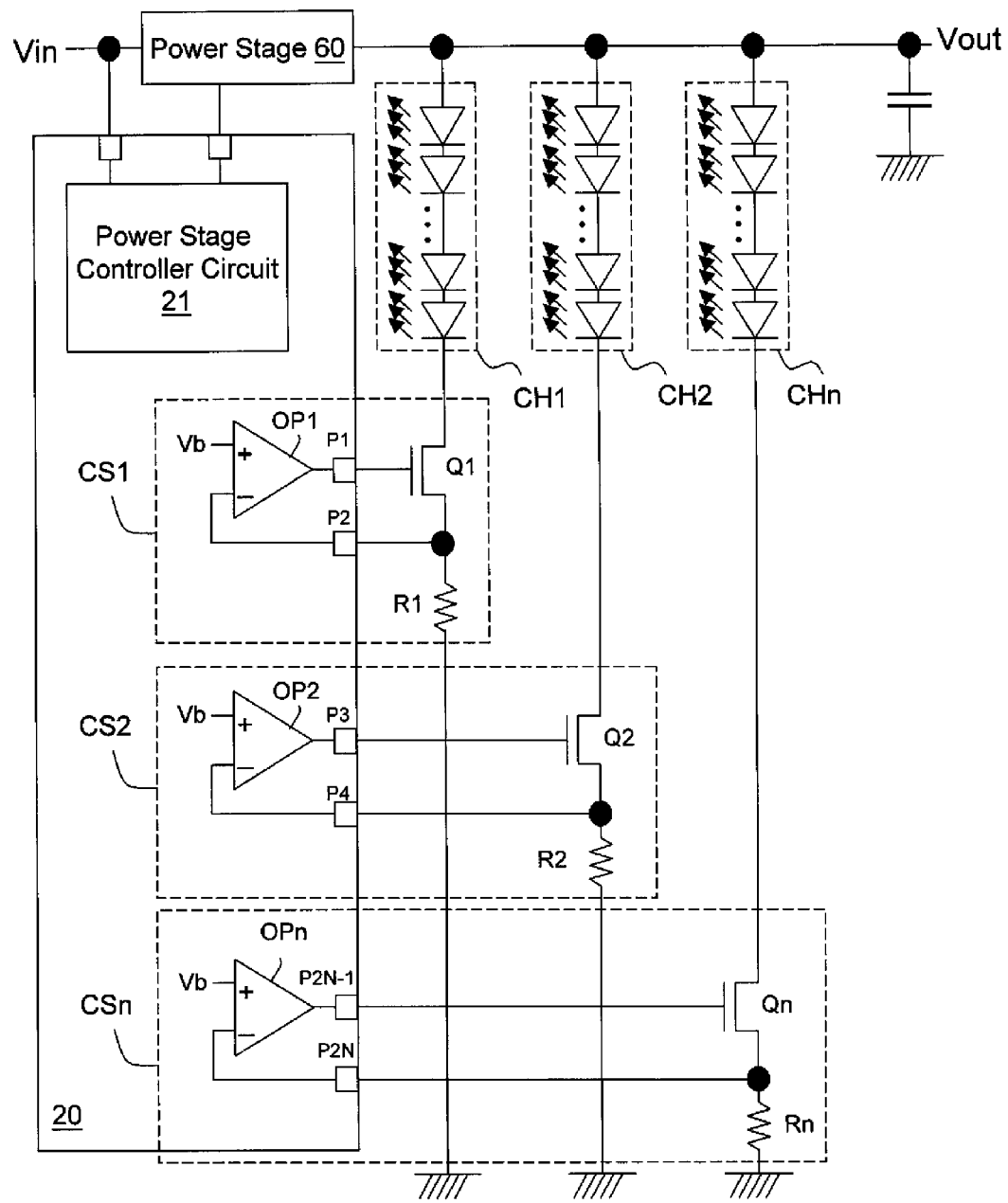
FIG. 1 illustrates a prior art light emitting device controller circuit with a drawback that its integrated circuit has too many pins.
Figure 2A:
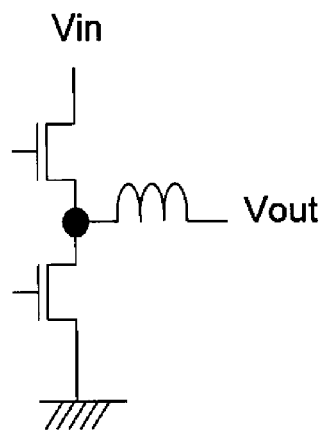
FIGS. 2A-2G illustrate several embodiments of a power stage circuit 60.
Figure 2B:
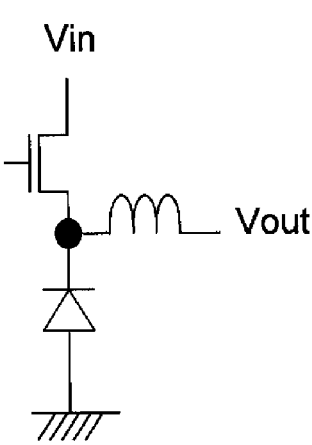
Figure 2C:
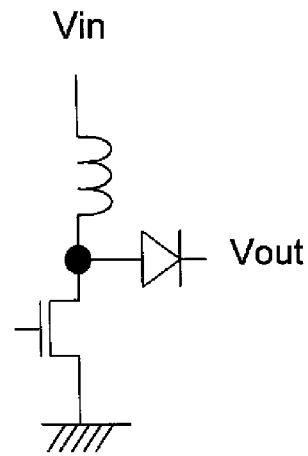
Figure 2D:
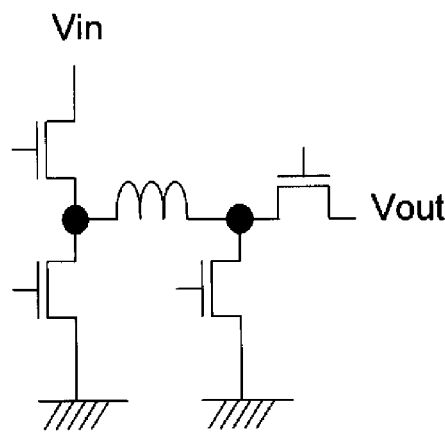
Figure 2E:
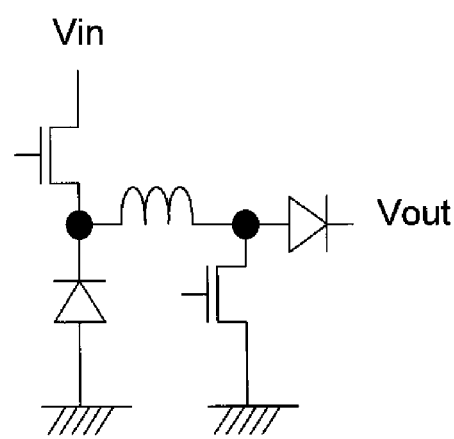
Figure 2F:
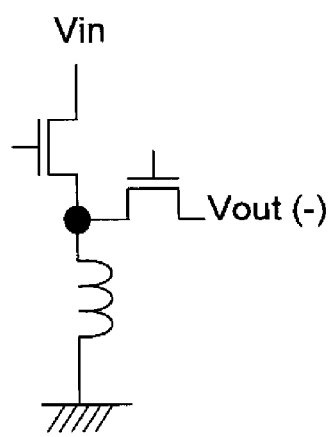
Figure 2G:
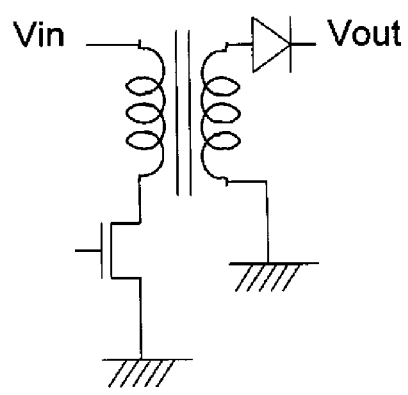
Figure 3:
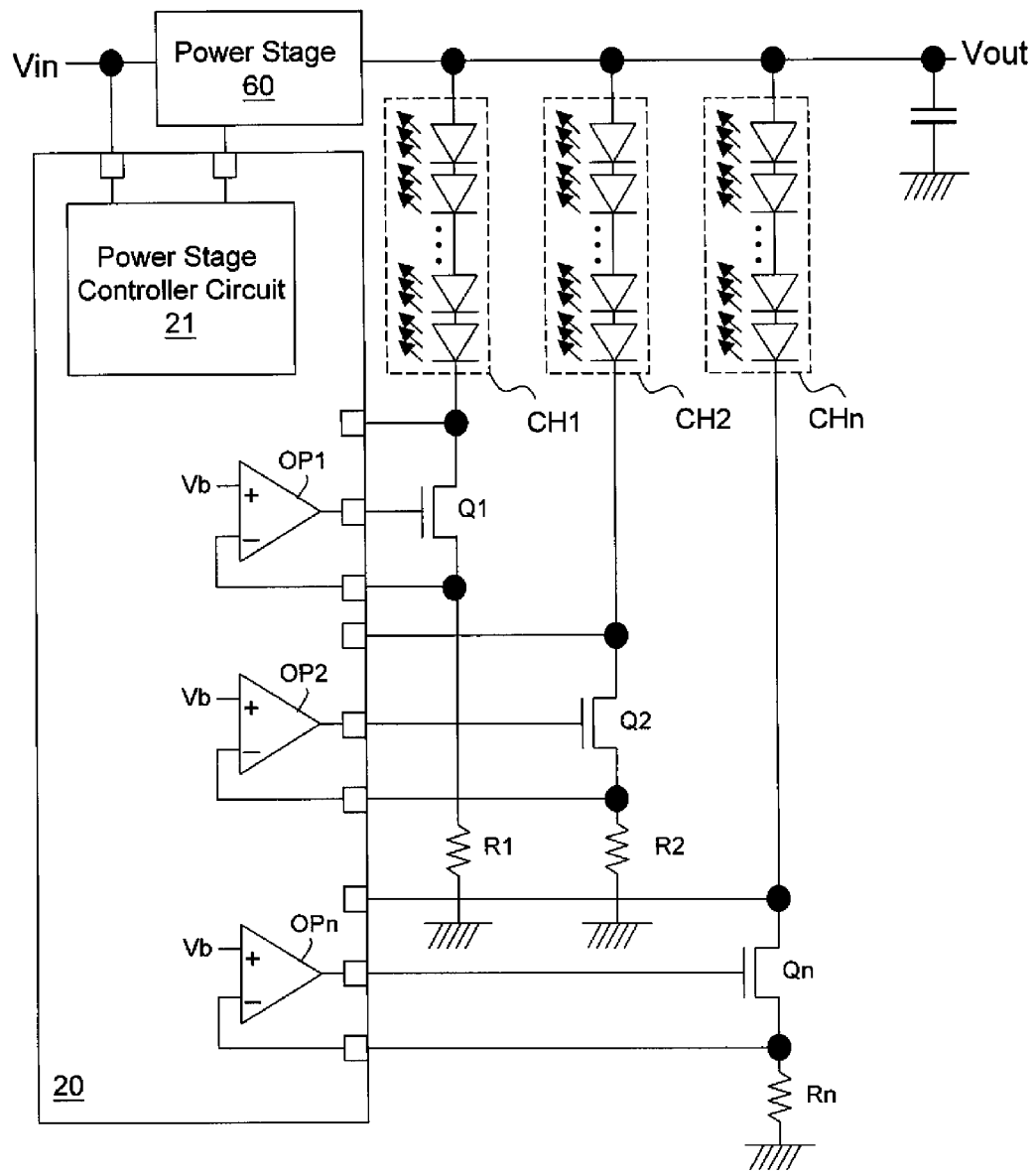
FIG. 3 shows another prior art light emitting device controller circuit, having a drawback of too many pins as well.
Figure 4:
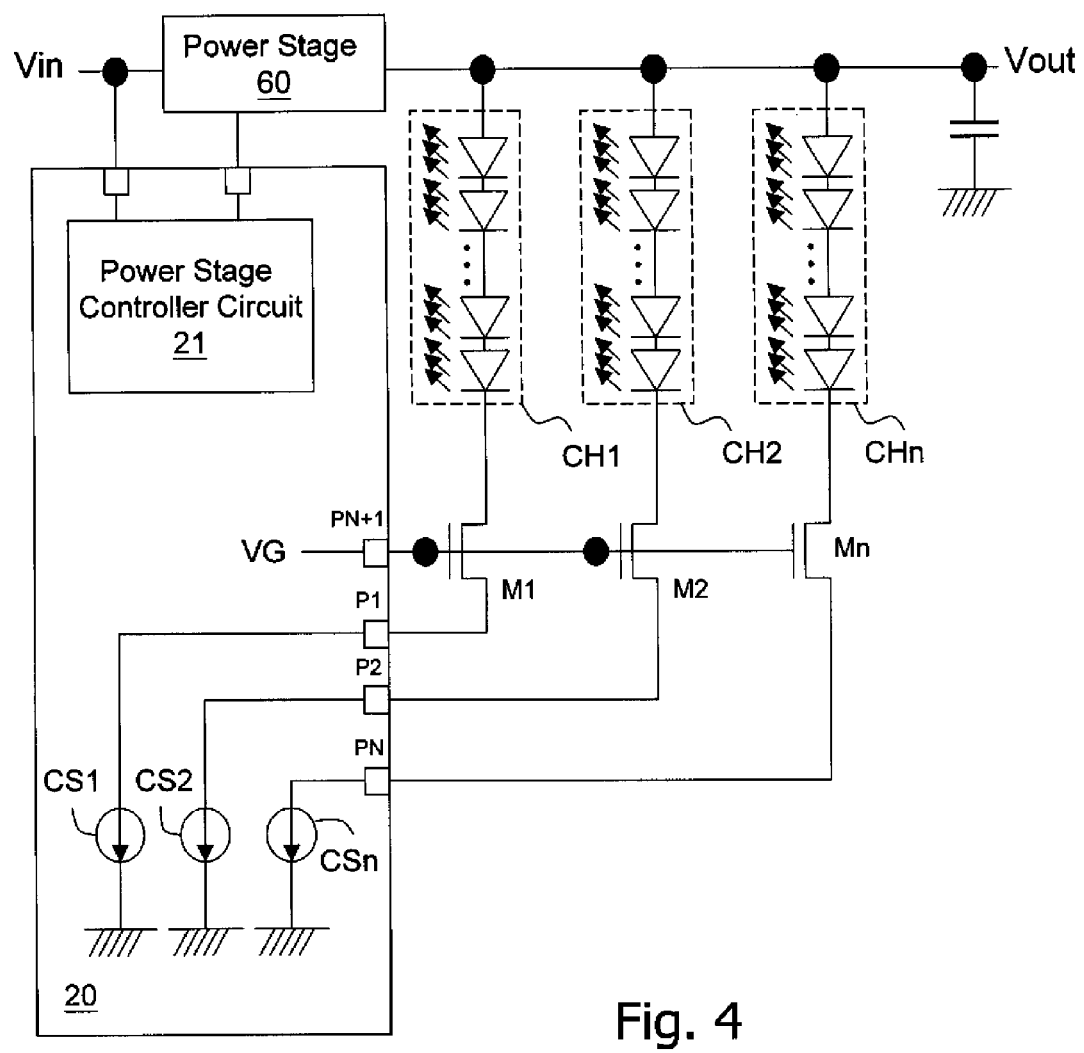
FIG. 4 shows an embodiment of a light emitting device controller circuit of the present invention.

FIG. 4 shows the first embodiment of the present invention. The present invention integrates current source circuits CS1-CSn into the integrated circuit 20, and provides transistor switches M1-Mn in the LED channel CH1-CHn, respectively, wherein the gates of these transistor switches M1-Mn are controlled by a voltage VG. The voltage VG for example can be a constant voltage or a periodical square-wave signal. When the voltage VG is a square-wave signal, the average current of each LED channel can be adjusted according to the duty ratio of the voltage VG, that is, to adjust the brightness of the LED by the duty ratio of the voltage VG. Because the gate voltage of each transistor switch M1-Mn is VG, the highest voltage at the source of each transistor switch M1-Mn will not be higher than VG. Thus, the transistor switches M1-Mn provide a function to block high voltage, such that the devices forming the current source circuits CS1-CSn can be made of low voltage devices which can be integrated in the integrated circuit 20. As shown in the drawing, to control N LED channels, the integrated circuit 20 according to the present invention only requires N+1 pins, the number being far less than that shown in FIG. 1 or 3.

Figure 5:
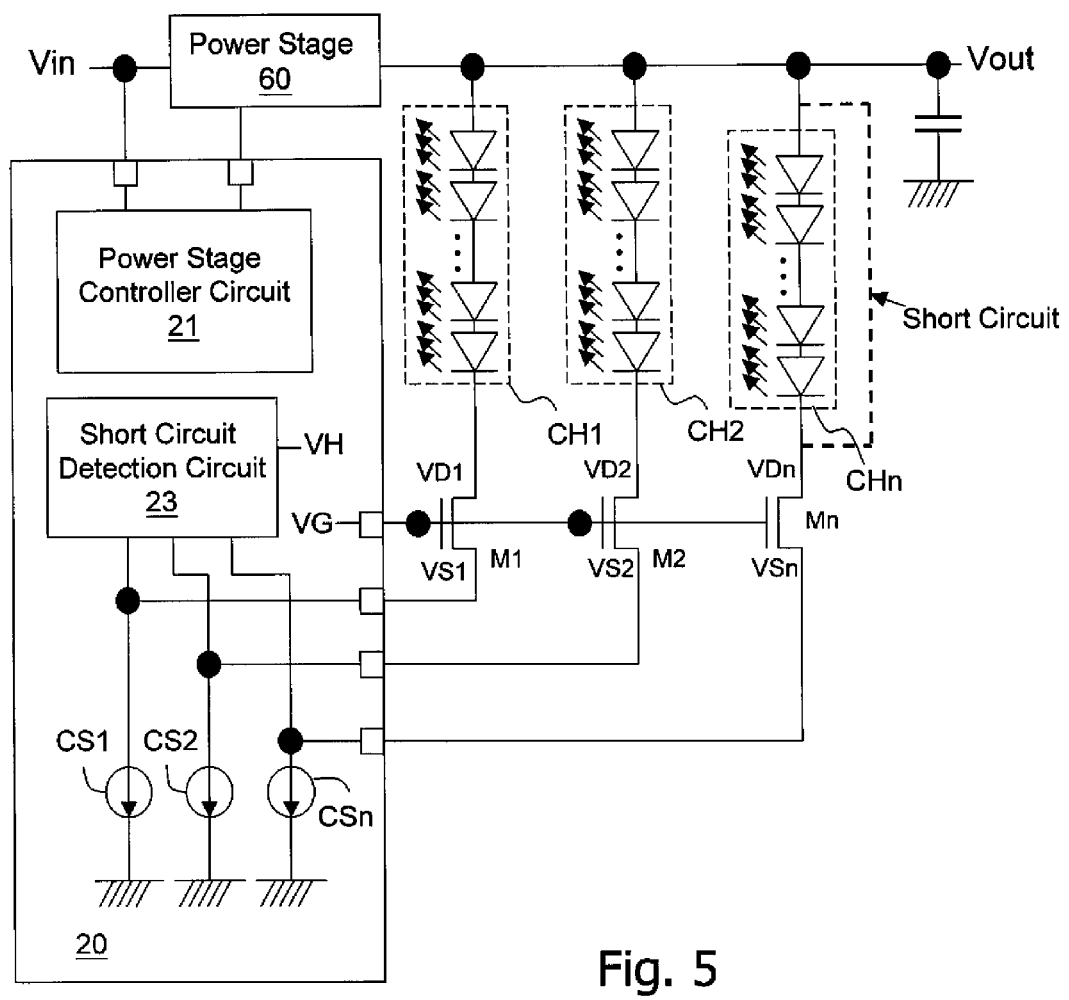
FIG. 5 shows another embodiment of a light emitting device controller circuit of the present invention.

FIG. 5 shows another embodiment of the present invention. In this embodiment, a short circuit detection circuit 23 is further provided to detect whether a short circuit occurs in each LED channel. As shown in the drawing, to detect whether a short circuit occurs in an LED channel, it is not required to provide one or more additional pins to obtain a signal from outside of the integrated circuit 20; the drain voltage of a corresponding transistor switch M1-Mn can be obtained from inside of the integrated circuit 20.

Figure 6:
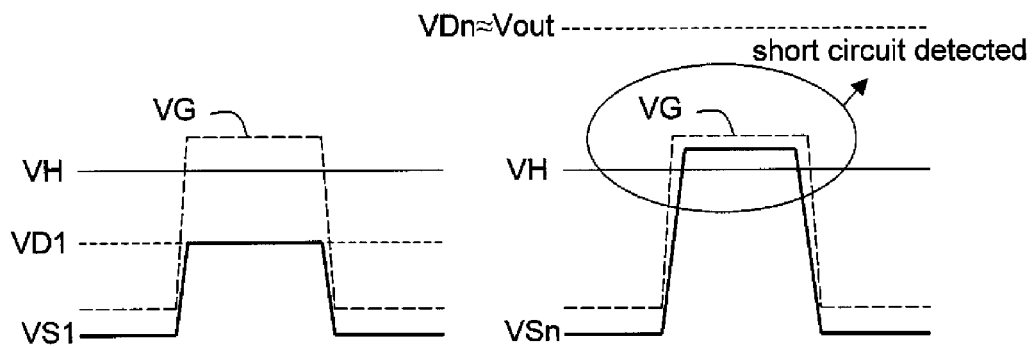
FIG. 6 illustrates an example of short circuit detection.

Referring to FIGS. 5 and 6, an example is given for illustrating how to determine that a short circuit occurs in an LED channel, according to the source voltage of the corresponding transistor switch M1-Mn. In any LED channel in conduction, the drain voltage VD1-VDn of the corresponding transistor switch M1-Mn is equal to the difference obtained by subtracting a sum of the voltages of all LEDs in the LED channel from the input voltage Vin; the source voltage VS1-VSn of the corresponding transistor switch M1-Mn is equal to the difference obtained by subtracting a transistor threshold voltage VT from VG. If the voltage VG increases, the source voltages VS1-VSn will increase accordingly until the source voltages VS1-VSn are about equal to the drain voltages VD1-VDn. From this point on, the source voltages VS1-VSn are clamped at the drain voltages VD1-VDn, and do not follow the increase of VG.

Referring to FIG. 5 and FIG. 6, assuming that the first LED channel CH1 is under normal operation but a short circuit occurs in the n-th LED channel CHn, because of the short circuit, the drain voltage VDn is about equal to the output voltage Vout, far higher than the drain voltage VD1 under normal operation. As such, a reference voltage VH can be set at any level between the normal drain voltage and the output voltage Vout, and the short circuit can be detected by increasing the voltage VG to a level higher than this reference voltage VH. As mentioned earlier, when the voltage VG increases, the source voltages of the transistor switches M1-Mn increase accordingly, but their highest level can at most be about equal to the corresponding drain voltages. Hence, in the first LED channel under normal operation, the voltage VS1 is clamped at the drain voltage VD1, which is lower than the reference voltage VH; while in the n-th LED channel CHn where a short circuit occurs, the voltage VSn is higher than the reference voltage VH. In this way, the short circuit detection circuit 23 can obtain short circuit information relating to an LED channel by a comparator comparing the reference voltage VH with the source voltage VS1-VSn of the corresponding transistor switch M1-Mn.

Figure 7:
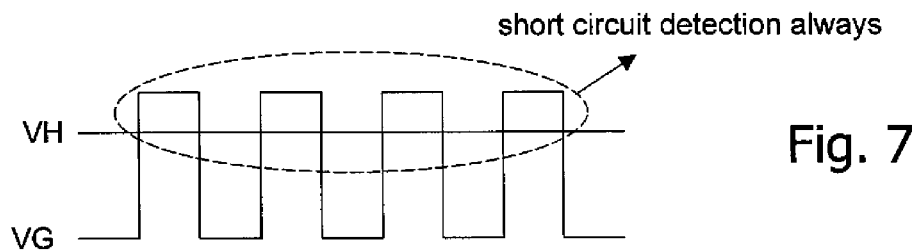
FIGS. 7-9 illustrate several methods for short circuit detection.
Figure 8:
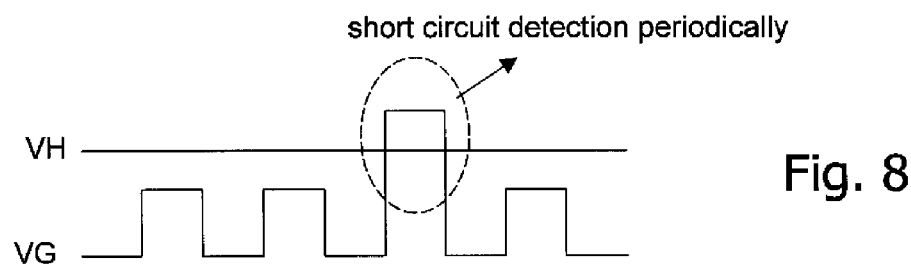
Figure 9:
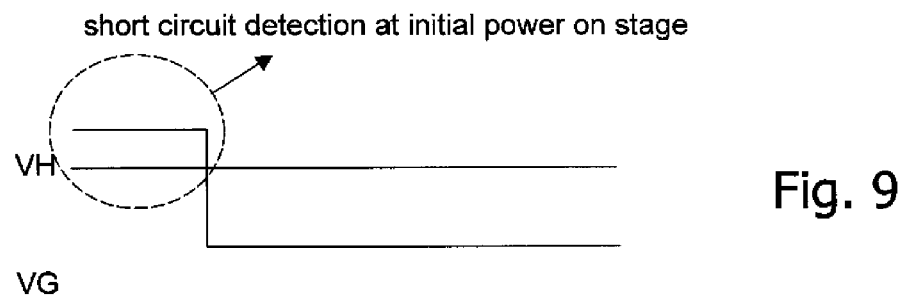

The detection to determine whether a short circuit occurs in the LED channels can be performed always or periodically. Referring to FIGS. 7 and 8, when the voltage VG is a square-wave signal, the short circuit detection can be always performed by setting the high level of the voltage VG to be always higher than the reference voltage VH. Or, the short circuit detection can be performed periodically by pulling the voltage VG higher than the reference voltage VH every several cycles. Or, the short circuit detection can be performed only once at the initial power on stage. When the voltage VG is a constant voltage, the short voltage detection can be always performed by keeping the constant voltage higher than the reference voltage VH. Or, referring to FIG. 9 as an example, the short voltage detection can be performed only once at the initial power on stage where the voltage VG is set higher than the reference voltage VH, and then the voltage VG drops to be a constant voltage lower than the reference voltage VH.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. For example, the transistor switches M1-Mn can be NMOS transistors or PMOS transistors. As another example, the light emitting device does not have to be LED, but can be any light emitting device whose brightness is controlled by current. As yet another example, the present invention can be used in applications with a single LED channel, not limited to multiple LED channels. As yet another example, the current source circuits CS1-CSn integrated in the integrated circuit 20 can be any types of current source circuits; for example, the MOS transistors Q1-Qn can be replaced by bipolar transistors (BJTs). In view of the foregoing, the spirit of the present invention should cover all such and other modifications and variations, which should be interpreted to fall within the scope of the following claims and their equivalents.

What is claimed is:

1. A light emitting device controller circuit comprising:
a power stage controller circuit controlling a power stage circuit to convert an input voltage to an output voltage, the output voltage being supplied to at least one light emitting device channel which includes at least one light emitting device;
a transistor switch in the light emitting device channel; and
a current source circuit controlling a current through the light emitting device channel;
wherein the power stage controller circuit and the current source circuit are integrated in an integrated circuit which provides a control voltage to control a gate of the transistor switch, the control voltage being below a voltage which fully turns on the transistor switch when the at least one light emitting device channel is not under a short circuit detection.

2. The light emitting device controller circuit of claim 1, wherein the transistor switch has a first terminal coupled to the light emitting device and a second terminal coupled to the current source circuit, and the light emitting device controller circuit further comprises a short circuit detection circuit for comparing a voltage at the second terminal of the transistor switch with a reference voltage to determine whether a short circuit occurs in the light emitting device channel.

3. The light emitting device controller circuit of claim 2, wherein the reference voltage is at a level between the output voltage and a voltage at the first terminal of the transistor switch.

4. The light emitting device controller circuit of claim 2, wherein the control voltage is a constant voltage and higher than the reference voltage.

5. The light emitting device controller circuit of claim 2, wherein the control voltage is higher than the reference voltage at initial power on stage.

6. The light emitting device controller circuit of claim 2, wherein the control voltage is a square-wave signal having a high level higher than the reference voltage.

7. The light emitting device controller circuit of claim 2, wherein the control voltage is a square-wave signal having a high level periodically higher than the reference voltage.

8. A method for controlling a light emitting device in a light emitting device channel, comprising:
    providing a transistor switch in the light emitting device channel;
    providing an integrated circuit, the transistor switch being located outside of the integrated circuit;
    providing a current source circuit in the integrated circuit to control a current through the light emitting device channel; and
    providing a control voltage by the integrated circuit to control a gate of the transistor switch, the control voltage being below a voltage which fully turns on the transistor switch when the light emitting device channel is not under a short circuit detection.

9. The method of claim 8, wherein the transistor switch has a first terminal coupled to the light emitting device, and a second terminal coupled to the current source circuit, and the method further comprises: comparing a voltage at the second terminal of the transistor switch with a reference voltage to determine whether a short circuit occurs in the light emitting device channel.

10. The method of claim 9, wherein the light emitting device has a terminal coupled to a voltage supply and another terminal coupled to the transistor switch, and wherein the reference voltage is at a level between the voltage supply and a voltage at the first terminal of the transistor switch.

11. The method of claim 9, wherein the control voltage is a constant voltage and higher than the reference voltage.

12. The method of claim 9 further comprising: causing the control voltage to be higher than the reference voltage at initial power on stage.

13. The method of claim 9, wherein the control voltage is a square-wave signal having a high level higher than the reference voltage.

14. The method of claim 9, wherein the control voltage is a square-wave signal having a high level periodically higher than the reference voltage.

15. An integrated circuit for use in a light emitting device controller circuit which controls at least one light emitting device channel, the channel including at least one light emitting device and one transistor switch coupled to the light emitting device, wherein the light emitting device controller circuit includes a power stage circuit, the integrated circuit comprising:
    a power stage controller circuit controlling the power stage circuit to convert an input voltage to an output voltage supplied to the at least one light emitting device channel; and
    a current source circuit controlling a current through the light emitting device channel;
    wherein the integrated circuit provides a control voltage to control a gate of the transistor switch, the control voltage being below a voltage which full turns on the transistor switch when the at least one light emitting device channel is not under a short circuit detection.

16. The integrated circuit of claim 15, wherein the transistor switch has a first terminal coupled to the light emitting device and a second terminal coupled to the current source circuit, and the integrated circuit further comprises a short circuit detection circuit for comparing a voltage at the second terminal of the transistor switch with a reference voltage to determine whether a short circuit occurs in the light emitting device channel.

17. The integrated circuit of claim 16, wherein the reference voltage is at a level between the output voltage and a voltage at the first terminal of the transistor switch.

18. The integrated circuit of claim 16, wherein the control voltage is a constant voltage and higher than the reference voltage.

19. The integrated circuit of claim 16, wherein the control voltage is higher than the reference voltage at initial power on stage.

20. The integrated circuit of claim 16, wherein the control voltage is a square-wave signal having a high level higher than the reference voltage.

21. The integrated circuit of claim 16, wherein the control voltage is a square-wave signal having a high level periodically higher than the reference voltage.

* * * * *